No. 680,022. Patented Aug. 6, 1901.
O. D. CHARLES.
NON-SPILLABLE CUSPIDOR.
(Application filed Sept. 11, 1900.)

(No Model.)

Witnesses:
J. P. Appleman,
E. E. Potter

Inventor
Oliver D. Charles
By
N. C. Evert & Co.
Atty's

THE NORRIS PETERS CO., PHOTO-LITHO., WASHINGTON, D. C.

UNITED STATES PATENT OFFICE.

OLIVER D. CHARLES, OF HOMESTEAD, PENNSYLVANIA.

NON-SPILLABLE CUSPIDOR.

SPECIFICATION forming part of Letters Patent No. 680,022, dated August 6, 1901.

Application filed September 11, 1900. Serial No. 29,677. (No model.)

*To all whom it may concern:*

Be it known that I, OLIVER D. CHARLES, a citizen of the United States of America, residing at Homestead, in the county of Allegheny and State of Pennsylvania, have invented certain new and useful Improvements in Non-Spillable Cuspidors, of which the following is a specification, reference being had therein to the accompanying drawings.

This invention relates to certain new and useful improvements in cuspidors, and particularly to that class that will not spill when upset.

The invention has for its object the provision of novel means whereby the contents of the cuspidor will be so directed when the vessel is upset that it will not spill.

The invention has for its further object to construct a cuspidor of this class which will be extremely simple in construction, strong, durable, and highly efficient in its operation.

A still further object of the invention is to construct a cuspidor that may be easily taken apart and cleaned.

With the above and other objects in view the invention finally consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1:
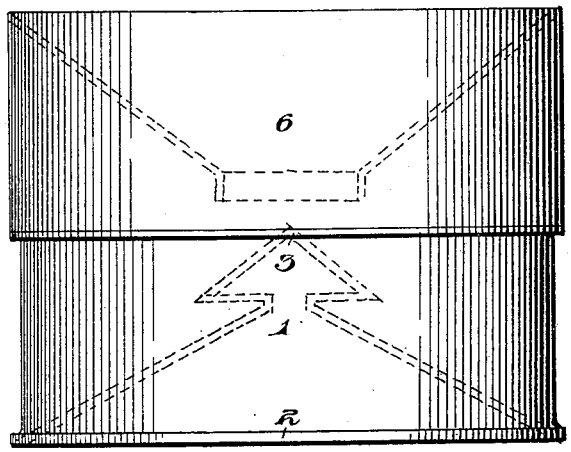
Figure 2:
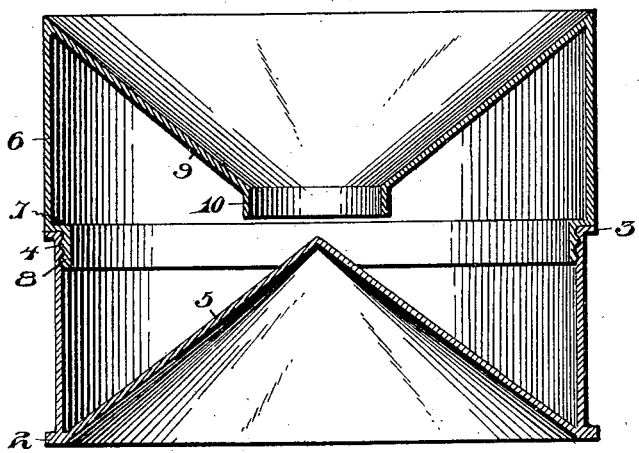
Figure 3:
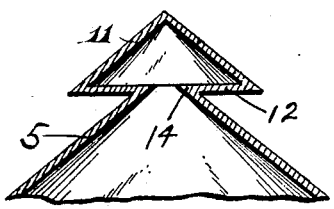

Figure 1 is a side elevation of my improved cuspidor, showing in dotted lines the interior construction thereof. Fig. 2 is a vertical sectional view thereof with the upper cone removed. Fig. 3 is a similar view of a modified form of inner cone.

In the drawings the reference-numeral 1 indicates the lower vessel of the cuspidor, carrying at its base an annular flange 2 and at its ridge an annular flange 3. The reference-numeral 4 represents interior screw-threads which are formed at the top of the vessel 1. The bottom of the vessel 1 forms a cone 5, the apex of said cone being almost in alinement with the annular flange 3.

The reference-numeral 6 denotes the upper section of the cuspidor, said section being of slightly-greater diameter than the vessel 1. The said section is provided with a shoulder 7, adapted to be seated upon the annular flange 3, the lower end of this section 6 being screw-threaded, as shown at 8, to register with the screw-threads 4 of the vessel and forming a screw-threaded connection between the vessel 1 and the upper section of the cuspidor.

The reference-numeral 9 indicates a bell-shaped mouth extending to the top of the upper section 6 and terminating at its lower extremity into a downwardly-extending portion 10, the latter being in close proximity to the apex of the cone.

The reference-numeral 11 indicates an upper cone, which is mounted upon and formed integral with the lower cone 5. This upper cone has an inwardly-extending flange 12, which connects at 14 to the apex of the lower cone 5, the apex of the lower cone being open in order to form the outwardly-extending flange.

The operation of my improved cuspidor is as follows: When the same is upset or tilted to rest upon its side, the contents of the cuspidor will not spill through the bell-shaped mouth. The contents of the cuspidor as it is tilted will flow toward the upwardly-extending end of the lower cone 5. The contents will then by reason of the outwardly-extending flange be directed in the opposite direction and will thus prevent the contents from discharging through the bell-shaped mouth, as will be readily understood.

The many advantages of my improved cuspidor will be readily apparent from the foregoing description and by referring to the accompanying drawings, fully illustrating my improved form of cuspidor.

In case it is desired to clean the cuspidor the upper section may be easily removed from the vessel, and the interior parts are then easily accessible for the purpose of cleaning the same.

It will be noted that various changes may be made in the details of construction without departing from the general spirit of my invention.

Having thus fully described my invention, what I claim as new, and desire to secure by Letters Patent, is—

In a cuspidor, the combination of a lower vessel, a cone-shaped bottom extending upwardly from the bottom and side walls of said vessel to the center thereof, an outwardly-extending annular flange arranged to the upper end of said cone bottom, an upper cone secured upon said annular flange, an upper section of the cuspidor, a bell-shaped mouth formed therein, and means whereby said upper section and lower vessel are secured together, substantially as described.

In testimony whereof I affix my signature in the presence of two witnesses.

OLIVER D. CHARLES.

Witnesses:
JOHN NOLAND,
H. C. EVERT.